United States Patent
Arnoux et al.

(10) Patent No.: US 11,655,053 B2
(45) Date of Patent: May 23, 2023

(54) METHOD FOR DETERMINING A RECOMMENDED INFLATION PRESSURE FOR AN AIRCRAFT TIRE, AND ASSOCIATED MAINTENANCE METHODS

(71) Applicants: COMPAGNIE GENERALE DES ETABLISSEMENTS MICHELIN, Clermont-Ferrand (FR); SAFRAN, Paris (FR); SAFRAN LANDING SYSTEMS, Velizy-Villacoublay (FR); SAFRAN ELECTRONICS & DEFENSE, Boulogne-Billancourt (FR)

(72) Inventors: Michael Arnoux, Clermont-Ferrand (FR); Eric Carin Neba, Clermont-Ferrand (FR)

(73) Assignees: COMPAGNIE GENERALE DES ETABLISSEMENTS MICHELIN, Clermont-Ferrand (FR); SAFRAN, Paris (FR); SAFRAN LANDING SYSTEMS, Velizy-Villacoublay (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 392 days.

(21) Appl. No.: 16/759,539

(22) PCT Filed: Oct. 26, 2018

(86) PCT No.: PCT/EP2018/079477
§ 371 (c)(1),
(2) Date: Apr. 27, 2020

(87) PCT Pub. No.: WO2019/081746
PCT Pub. Date: May 2, 2019

(65) Prior Publication Data
US 2020/0277086 A1    Sep. 3, 2020

(30) Foreign Application Priority Data

Oct. 27, 2017 (FR) .................................. 1760161

(51) Int. Cl.
*B60C 23/00*    (2006.01)
*B64F 5/60*    (2017.01)
(Continued)

(52) U.S. Cl.
CPC ................ *B64F 5/60* (2017.01); *B60C 23/02* (2013.01); *B60C 23/0479* (2013.01);
(Continued)

(58) Field of Classification Search
None
See application file for complete search history.

(56) References Cited

U.S. PATENT DOCUMENTS 6,838,983 B1 * 1/2005 Wong .................. B60S 5/046
152/415
7,004,019 B2 2/2006 Fisher et al.
(Continued)

FOREIGN PATENT DOCUMENTS

DE    2626475 A1    12/1976
EP    3069903 A1    9/2016
(Continued)

OTHER PUBLICATIONS

International Search Report dated Nov. 27, 2018, in corresponding PCT/EP2018/079477 (6 pages).

*Primary Examiner* — Brent Swarthout
(74) *Attorney, Agent, or Firm* — Venable LLP

(57) ABSTRACT

A method determines an inflation pressure expected in an aircraft tire provided with a pressure and temperature sensor. Also disclosed is a method for assistance in the maintenance for an aircraft tire and also a portable electronic device intended for assistance in the maintenance.

7 Claims, 1 Drawing Sheet

(51) Int. Cl.
  *B64F 5/40* (2017.01)
  *B64C 25/36* (2006.01)
  *B60C 23/02* (2006.01)
  *B60C 23/04* (2006.01)
  *B64D 45/00* (2006.01)

(52) U.S. Cl.
  CPC ............... *B64C 25/36* (2013.01); *B64F 5/40* (2017.01); *B64D 2045/0085* (2013.01)

(56) References Cited

U.S. PATENT DOCUMENTS

| | | | |
|---|---|---|---|
| 9,796,220 B2 * | 10/2017 | Graf | .................... B60C 23/0476 |
| 2003/0074961 A1 | 4/2003 | Fischer et al. | |
| 2008/0042817 A1 * | 2/2008 | Fogelstrom | ........... B60C 23/009 |
| | | | 340/442 |
| 2015/0224831 A1 | 8/2015 | Miller | |
| 2016/0272020 A1 | 9/2016 | Bill | |

FOREIGN PATENT DOCUMENTS

| | | |
|---|---|---|
| FR | 2829423 A1 | 3/2003 |
| WO | 2009/036547 A1 | 3/2009 |

* cited by examiner

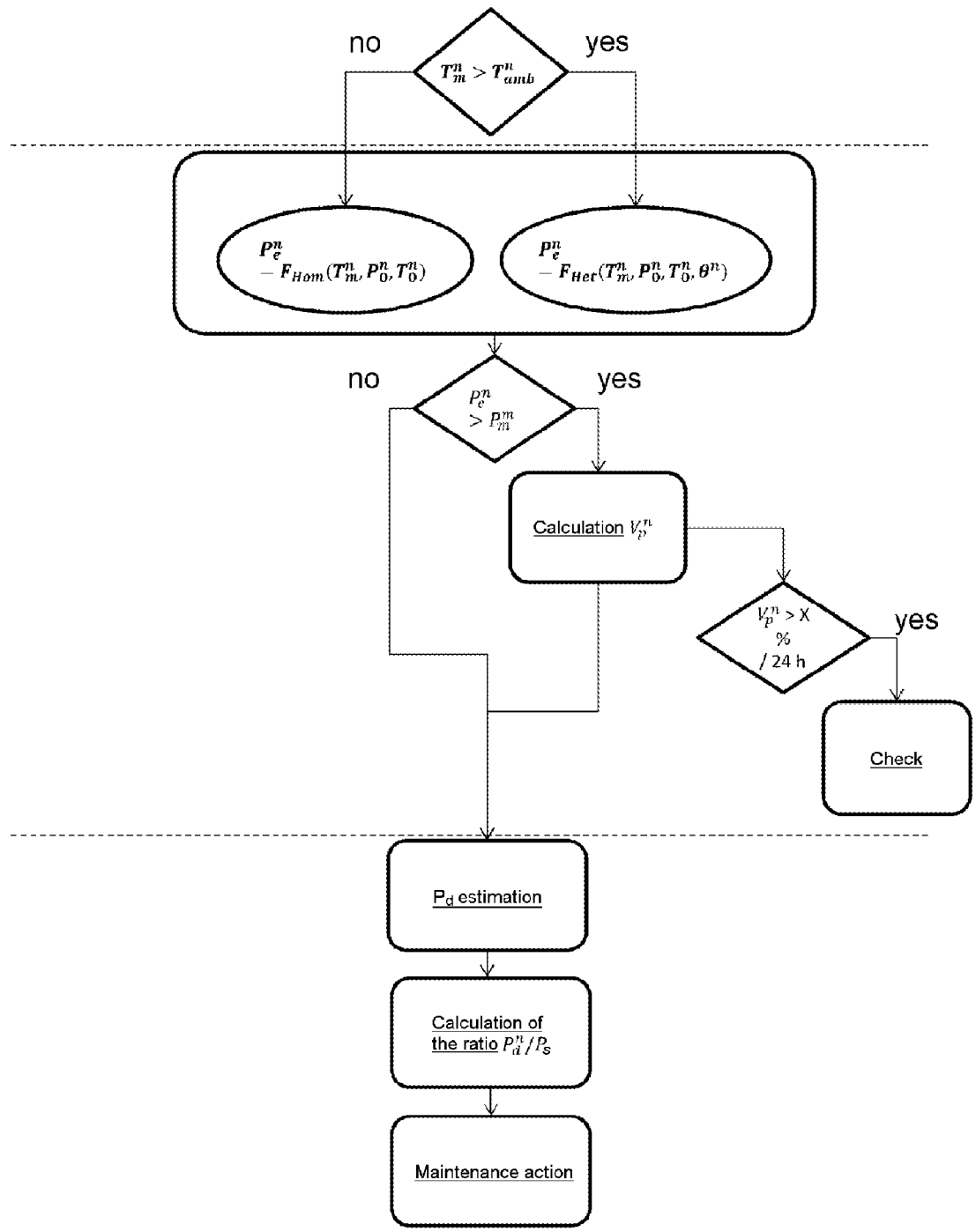

METHOD FOR DETERMINING A RECOMMENDED INFLATION PRESSURE FOR AN AIRCRAFT TIRE, AND ASSOCIATED MAINTENANCE METHODS

FIELD OF THE INVENTION

The present invention comes within the field of aeronautics and more particularly within the field of the upkeep and maintenance of aircraft tyres. More specifically, the invention relates to the monitoring of the pressure of aircraft tyres.

It is known that poor inflation of aircraft tyres can cause numerous problems. Thus, an overinflation can result in degradation of the tread, either by uneven wear or by rendering it more sensitive to detrimental mechanical changes. Conversely, an underinflation considerably increases the stresses and the heating in the tyre, which can reduce the lifetime of the tyre, indeed even cause safety risks, such as bursting of the tyre or a tread separation.

In order to overcome this situation, it is recommended by tyre manufacturers to carry out daily monitoring of the pressure of the tyres. In addition, it is generally specified to always carry out this monitoring when the tyres are cold, that is to say when the internal temperature of the tyres is substantially equal to ambient temperature. It is also inadvisable to deflate a hot tyre.

Thus, documents are known comprising recommendations for the cold inflation of aircraft tyres, and the set pressures ($P_s$) to be applied depending on the type of tyres, on their dimensions and optionally on the load of the aircraft. These documents also indicate pressure maintenance recommendations, depending on the divergences from $P_s$.

In point of fact, with the increase in air traffic, it is increasingly frequently the case that aircraft do not remain on the ground for a sufficiently long time between the landing and the following takeoff for the maintenance of the tyres to be carried out when they are cold. In addition, high divergences from ambient temperature between a takeoff and landing airport, for example ranging from values of greater than 50° C. to values of less than −20° C., can bias the detection actions. Consequently, it is turning out today to be increasingly complicated to guarantee a satisfactory pressure of aircraft tyres under all conditions.

Thus, the invention is targeted at providing a solution for overcoming the abovementioned disadvantages.

SUMMARY OF THE INVENTION

The invention thus relates to a method for determining an expected inflation pressure for an aircraft tyre comprising a pressure and temperature sensor in contact with the inflation gas of the tyre. This method comprises the following stages:
  in a preliminary stage, a pressure $P_0$ and a temperature $T_0$ of the tyre, measured at a time to, are recorded in a memory of the pressure and temperature sensor. The time $t_0$ is preferentially also recorded.
  at a moment t, the internal air temperature $T_m$ of the tyre and the ambient air temperature $T_{amb}$ are measured and these two values are compared. Preferentially, no pressure maintenance action took place between the times t and $t_0$.
  if the two temperatures are equal or substantially equal, a pressure expected at the moment t, $P_{expected\_hom}$, is then determined in the form $P_{expected\_hom}=P_0*T_m/T_0$.
  if the two temperatures are different, a pressure expected at the moment t, $P_{expected\_het}$, is then determined in the form $P_{expected\_het}=F(T_m, P_0, T_0$ and $\theta)$ where F is a linear and/or polynomial function and $\theta$ depends on the position of the pressure and temperature sensor in the tyre at the moment t.

The term "pressure expected" or "expected pressure" is understood to mean the pressure which should theoretically be present in the tyres at the moment t for an internal temperature $T_m$, in the event of complete leaktightness of the tyre.

Thus, a method according to the invention employs two different laws:
  a "homogeneity" law, in the case where the tyre is at ambient temperature, and where it can thus be assumed that the temperature is homogeneous throughout the tyre, and
  a "heterogeneity" law, in the case where the tyre has not yet completely cooled down to ambient temperature.

In this second case, it has been found that the cooling in the tyre does not take place homogeneously and that it is thus necessary to take into account the position of the sensor at the moment of the measurement, in order to obtain correct data. This is because, when a tyre is in the cooling phase, the lower part of the volume of inflation gas present in the tyre is at a lower temperature than that of the upper part of the volume of inflation gas of the tyre. In order to take into account this differential, a parameter dependent on the position of the sensor is then introduced into the heterogeneity formula. According to the embodiments, this parameter $\theta$ can correspond to the height of the sensor, with respect to the ground, or else to the angular position, or azimuth, of the sensor. This is because these two pieces of information make it possible to determine in what zone the sensor is found, among the three previously mentioned.

A method according to the invention thus makes it possible to determine a pressure expected for the tyre whatever the temperature conditions under which the tyre is found, which thus makes it possible to provide the maintenance operations as soon as the plane has landed, without having to wait for the tyre to completely cool.

In an advantageous embodiment, the function F is a linear function and there then exists $P_{expected\_het}(t)=A(\theta)*(T_m(t)-T_0)+P_0$ where $A(\theta)=p_1*\theta+p_2$ with $p_1$ and $p_2$ which are predetermined constants.

In another advantageous embodiment, the function F is a polynomial function and there then exists $$P_{expected\_het}=A(\theta)*(T_m(t)-T_0)^2+B(\theta)*(T_m-T_0)+P_0$$

where $A(\theta)$ and $B(\theta)$ are predetermined polynomial functions.

The invention also relates to a method for the detection of loss of pressure for an aircraft tyre, comprising the following stages:
  An expected pressure $P_{exp}$ of the tyre is determined using a method as described above,
  The internal air pressure $P_m$ of the tyre at the moment t is measured,
  The values $P_{exp}$ and $P_m$ are compared, and
    If $P_{exp}=P_m$, then no loss of pressure is detected,
    If $P_{exp}>P_m$, a rate of loss of pressure $V_p$ is determined,
    If $V_p$ is less than a predetermined threshold, it is detected that the loss of pressure is acceptable and, if $V_p$ is greater than this predetermined threshold, it is detected that the loss of pressure is not acceptable.

In a preferred embodiment, the predetermined threshold is expressed as percentage and is, for example, between 4% and 10% per 24 h, preferentially of the order of 5%/24 h.

In a preferred embodiment, the rate of loss of pressure is calculated as follows: $V_p=(P_0-P_{0,eq})/P_c*(t-t_0)$, where $P_{0,eq}$ is the pressure which it would be necessary to have at the moment to in order for the pressure expected at the moment t to be equal to $P_m$.

In a preferred embodiment, the calculation of $P_{0,eq}$ depends on the thermal state (homogeneous or heterogeneous) of the tyre:

If the thermal state is homogeneous, $P_{0,eq}=P_m/(T_m/T_0+1)$ is calculated,

If the thermal state is heterogeneous, the formula mentioned previously in section [0012] will be used to calculate $P_{0,eq}$.

The invention also relates to a method for assistance in the maintenance for an aircraft tyre, comprising the following stages:

an expected pressure is calculated using a method as described previously, a takeoff pressure $P_{tak}$ in the absence of maintenance is determined, the ratio of the takeoff pressure $P_{tak}$ to a set pressure $P_s$ to be applied as a function of the type of the tyres, of their dimensions and optionally of the load of the aircraft is calculated and, depending on the value of this ratio, a maintenance operator is ordered to carry out a maintenance action.

In an advantageous embodiment, the method for assistance in the maintenance additionally comprises the following stages:

it is detected if an escape of pressure is present by using a method as described previously, if an unacceptable escape of pressure is present, the need to carry out a check on the fitted assembly is indicated to a maintenance operator, and a maintenance operation is not ordered.

Alternatively, in another embodiment, when an escape of pressure is detected, a maintenance operator is informed but a maintenance action is ordered all the same.

In an advantageous embodiment, the takeoff pressure $P_{tak}$ in the absence of maintenance is determined as follows:

A temperature of the tyre at takeoff $T_{tak}$ is determined, $P_{tak}=P_0*T_{tak}/T_0$ is then calculated.

The takeoff temperature $T_{tak}$ is determined as a function of the holding time of the aircraft between landing and the following takeoff. This is because, if this holding time is greater than 3 h, the tyre will have completely cooled and there will then exist $T_{tak}=T_{amb}$. If the aircraft takes off again before this period of time of 3 hours, then it is known that $T_{tak}$ will be located between $T_m$ and $T_{amb}$.

In an advantageous embodiment, the order to an operator to carry out a maintenance action is included in the group consisting of:

An instruction to do nothing if the $P_{tak}/P_s$ ratio is between 100% and 105%, An instruction to inflate the tyre if the ratio is between 95% and 100%, An instruction to deflate the tyre if the ratio is greater than 105%, An instruction to inspect the fitted assembly if the ratio is less than 95%.

In the case where it is necessary to inflate the tyre, provision is then made, in a preferred embodiment, for the calculation of a pressure differential $$\Delta P = A\left(\theta, \frac{P_S}{T_{amb}}*T_0, T_0\right)*(T_m - T_0^n) + \frac{P_S}{T_{amb}}*T_0 - P_m$$

Preferentially, recorded values $P_0$, $T_0$ and $t_0$ are updated after each pressure maintenance operation.

Advantageously, such a method can be employed using a portable electronic device, such as a telephone or a tablet, the said device comprising:

means for communicating with the pressure and temperature sensor installed on the tyre, in order to read the data recorded in a memory of the tyre, means for determining an ambient temperature, either directly or by reading a temperature determined by a sensor installed on the aircraft, a calculator which makes it possible to carry out the calculations employed in the various methods according to the invention, a graphical interface which makes it possible to display, sent to a maintenance operator, one or more pieces of information included in the group consisting of: the pressures and/or temperatures measured, the calculated pressures, an indication relating to the presence or absence of an acceptable or unacceptable loss of pressure, and information relating to a maintenance operation to be carried out.

In a specific embodiment, the device comprises means for writing in a memory of the sensor.

DETAILED DESCRIPTION

Other objectives and advantages of the invention will become clearly apparent in the description which will follow of a preferred but nonlimiting embodiment, illustrated by FIG. 1, which graphically represents the various stages employed in a method for maintenance of tyres according to the invention.

DESCRIPTION OF THE BEST EMBODIMENT OF THE INVENTION

A description will now be given of an exemplary embodiment of a method according to the invention on an aircraft, provided with tyres provided with pressure and temperature sensors, taking off from an airport 1 and landing in an airport 2. It is specified here that the example will not describe the implementation of the method for just one tyre but that implementation on the other tyres is carried out similarly.

At a moment $t_0$, before takeoff from the airport 1, a note is taken of the pressure and of the internal temperature of the tyre. These values, $P_0=13.8$ bar and $T_0=15°$ C., are then recorded in a memory of the sensor.

When the aircraft lands on the airport 2 at a moment $T=t_0+18$ hours, the following measurements are carried out: $P_m$, $T_m$ and $T_{amb}$. In this example, $P_m=15.1$ bar, $T_m=70°$ C. and $T_{amb}=25°$ C. The pressure and temperature sensor is positioned with an angle of 45° with respect to the vertical.

The various stages shown in the graph will subsequently be applied:

The thermal state of the tyre is determined by comparing Tm and Tamb→in the example Tm being greater than Tamb ("yes" branch), the heterogeneity law has to be used.

In stage 2, the expected pressure is then calculated by applying this heterogeneity law, and $P_{exp\_het}=15.41$ bar is obtained.

The expected pressure is then compared with the measured pressure $P_m$; there exists $P_{exp\_het}>P_m$.

As the pressure expected is greater than the measured pressure ("yes" branch), the rate of loss of pressure in the tyre is calculated $V_p=2.74\%/24$ h.

As the rate of loss of pressure is within the limits of tolerance, in the case in point less than 5%/24 h, a maintenance operation can be ordered.

In order to do this, the takeoff pressure $P_{tak}$ is evaluated calculated and a $P_{tak}/P_s$ ratio is calculated according to a method as described previously. The takeoff will take place in 3 hours, at a takeoff temperature $T_{tak}$=26.4° C. It is thus determined that the takeoff pressure will be $P_{tak}$=13 bar. A $P_{tak}/P_s$=104% ratio then exists and thus no action is required.

The invention claimed is:

1. A method for determining an inflation pressure expected in an aircraft tire provided with a pressure and temperature sensor, the method comprising:
   in a preliminary stage, recording a pressure $P_0$ and a temperature $T_0$ of the tire, measured at a time $t_0$, in a memory of the pressure and temperature sensor;
   at a moment t, measuring and comparing an internal air temperature $T_m$ of the tire and an ambient air temperature $T_{amb}$; and
   if the two temperatures are equal or substantially equal, determining a pressure expected at the moment t, $P_{expected\_hom}$, using $P_{expected\_hom}=P_0*T_m/T_0$; or
   if the two temperatures are different, determining a pressure expected at the moment t, $P_{expected\_het}$, using $P_{expected\_het}=F(T_m, P_0, T_0$ and $\theta)$, where $\theta$ depends on a position of the pressure and temperature sensor in the tire at the moment t,
   wherein F is a linear function where $P_{expected\_het}(t)=A(\theta)*(T_m(t)-T_0)+P_0$, $A(\theta)=p_1*\theta+p_2$, and $p_1$ and $p_2$ are predetermined constants, or F is a polynomial function where $P_{expected\_het}=A(\theta)*(T_m(t)-T_0)^2+B(\theta)*(T_m-T_0)+P_0$ and $A(\theta)$ and $B(\theta)$ are predetermined polynomial functions.

2. A method for the detection of loss of pressure in an aircraft tire provided with a pressure and temperature sensor, the method comprising:
   determining an expected pressure $P_{exp}$ of the tire using the method according to claim 1;
   measuring an internal air pressure $P_m$ of the tire at the moment t is measured; and
   comparing values $P_{exp}$ and $P_m$ such that if $P_{exp}=P_m$, then no loss of pressure is detected, and if $P_{exp}>P_m$, a rate of loss of pressure $V_p$ is determined, where, if $V_p$ is less than a predetermined threshold, an acceptable loss of pressure is detected, and, if $V_p$ is greater than the predetermined threshold, an unacceptable loss of pressure is detected.

3. The method according to claim 2, wherein the predetermined threshold is expressed as percentage and is between 4 and 10% per 24 h.

4. The method according to claim 2, wherein a rate of loss of pressure is calculated as follows: $V_p=(P_0-P_{0,eq})/P_c*(t-t_0)$, where $P_{0,eq}$ is a pressure which would be necessary to have at the moment to in order for the pressure expected at the moment t to be equal to $P_m$.

5. A method for assistance in maintenance for an aircraft tire provided with a pressure and temperature sensor, comprising:
   determining an expected pressure $P_{exp}$ of the tire using the method according to claim 1;
   determining a takeoff pressure $P_{tak}$ in the absence of maintenance;
   calculating a ratio of the takeoff pressure $P_{tak}$ to a set pressure $P_s$ and, depending on a value of the ratio, carrying out a maintenance operation.

6. The method according to claim 5, wherein the takeoff pressure $P_{tak}$ in the absence of maintenance is determined as follows:
   calculating a temperature of the tire at takeoff $T_{tak}$; and
   calculating $P_{tak}=P_0*T_{tak}/T_0$.

7. The method according to claim 5, wherein the maintenance operation, knowing a set pressure $P_s$ of the tire, is selected from the group consisting of:
   doing nothing if the $P_{tak}/P_s$ ratio is between 100% and 105%,
   inflating the tire if the ratio is between 95% and 100%,
   deflating the tire if the ratio is greater than 105%, and
   inspecting a fitted assembly if the ratio is less than 95%.

* * * * *